United States Patent
Esquinas Fernandez et al.

(10) Patent No.: US 12,555,211 B2
(45) Date of Patent: Feb. 17, 2026

(54) DETECTING UNACCEPTABLE DETECTION AND SEGMENTATION ALGORITHM OUTPUT

(71) Applicant: International Business Machines Corporation, Armonk, NY (US)

(72) Inventors: Pedro Luis Esquinas Fernandez, Etobicoke (CA); Giovanni John Jacques Palma, Chaville (FR); Omid Bonakdar Sakhi, North York (CA); Paul Dufort, Toronto (CA); Thomas Binder, Fontenay-sous-bois (FR)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 17/455,024

(22) Filed: Nov. 16, 2021

(65) Prior Publication Data
US 2023/0153971 A1    May 18, 2023

(51) Int. Cl.
*G06T 7/00* (2017.01)
*G06F 9/54* (2006.01)
*G06N 5/01* (2023.01)

(52) U.S. Cl.
CPC ............ *G06T 7/0002* (2013.01); *G06F 9/542* (2013.01); *G06N 5/01* (2023.01); *G06T 2207/20081* (2013.01)

(58) Field of Classification Search
CPC ......... G06T 7/0002; G06T 7/10; G06T 7/215; G06T 2207/20081; G06T 2207/30004; G06T 2207/30096; G06V 10/00; G06V 10/26; G06V 10/40; G06V 10/776; G06F 18/217; G06N 5/01
See application file for complete search history.

(56) References Cited

U.S. PATENT DOCUMENTS

| | | | |
|---|---|---|---|
| 10,452,813 B2 | 10/2019 | Sorenson | |
| 12,148,136 B1 * | 11/2024 | Indeck | .................. G06T 7/143 |
| 2016/0140300 A1 | 5/2016 | Purdie et al. | |

(Continued)

OTHER PUBLICATIONS

"International Search Report and Written Opinion" International Search Authority, Date of Mailing Feb. 27, 2023, Applicant's or agent's file reference P202100926, International application No. PCT/EP2022/081930, International filing date Nov. 15, 2022, 10 pages.

(Continued)

*Primary Examiner* — Kent Yip
(74) *Attorney, Agent, or Firm* — Joseph P. Curcuru

(57) ABSTRACT

In an approach for automatically detecting whether an output of a detection and segmentation algorithm is of an acceptable quality, a processor receives an image. A processor applies a detection stage of a detection and segmentation algorithm to the image. A processor computes a set of features from a detection score map output by the detection stage of the detection and segmentation algorithm by analyzing the detection score map at more than one different operating points. A processor inputs the set of features into a classifier that predicts whether a final output of the detection and segmentation algorithm will be of an acceptable quality, wherein the acceptable quality is defined based on whether a detection precision threshold has been reached. A processor receives an output of the classifier.

20 Claims, 3 Drawing Sheets

(56) References Cited

U.S. PATENT DOCUMENTS

2016/0140330 A1    5/2016    Purdie
2016/0328855 A1   11/2016    Lay
2019/0080450 A1    3/2019    Arar
2021/0401392 A1*  12/2021    Bengtsson ............. G16H 30/40

OTHER PUBLICATIONS

Bhat et al., "Using uncertainty estimation to reduce false positives in liver lesion detection", arXiv:2101.04386v1 [eess.IV], Jan. 12, 2021, 5 Pages.

Corbiere et al., "Addressing Failure Prediction by Learning Model Confidence", NIPS'19: Proceedings of the 33rd International Conference on Neural Information Processing Systems, Article No. 26, Dec. 2019, 12 Pages.

Devries et al., "Leveraging Uncertainty Estimates for Predicting Segmentation Quality", arXiv:1807.00502v1 [cs.CV], Jul. 2, 2018, 9 Pages.

Ghesu et al., "Quantifying and Leveraging Classification Uncertainty for Chest Radiograph Assessment", arXiv:1906.07775v1 [cs.CV], Jun. 18, 2019, 9 Pages.

Jospin et al., "Hands-on Bayesian Neural Networks—a Tutorial for Deep Learning Users", arXiv:2007.06823v1 [cs.LG], Jul. 14, 2020, 35 Pages.

Mehrtash et al., "Confidence Calibration and Predictive Uncertainty Estimation for Deep Medical Image Segmentation", IEEE Transactions on Medical Imaging, Jul. 1, 2020, 11 Pages.

Mobiny et al., "Risk-Aware Machine Learning Classifier for Skin Lesion Diagnosis", Journal of Clinical Medicine, (8):1241, Aug. 17, 2019, 24 Pages.

European Patent Office, "EP Examination Report", Mar. 28, 2025, 07 pages, EP Application No 22817716.8.

* cited by examiner

DETECTING UNACCEPTABLE DETECTION AND SEGMENTATION ALGORITHM OUTPUT

BACKGROUND OF THE INVENTION

The present invention relates generally to the field of data processing, and more particularly to automatically detecting whether an output of a detection and segmentation algorithm is of an acceptable quality.

Object detection refers to the method of identifying and correctly labeling all the objects present in the image frame. This broadly consists of two steps: (1) object localization, in which a bounding box or enclosing region is determined in the tightest possible manner in order to locate the exact position of the object in the image and (2) image classification, in which the localized object is fed to a classifier that labels the object. Semantic segmentation refers to the process of linking each pixel in the given image to a particular class label. These segments are then used to find the interactions/relations between various objects. Instance segmentation involves associating a class label to each pixel similar to semantic segmentation, except that it treats multiple objects of the same class as individual objects/separate entities.

SUMMARY

Aspects of an embodiment of the present invention disclose a method, computer program product, and computer system for automatically detecting whether an output of a detection and segmentation algorithm is of an acceptable quality. A processor receives an image. A processor applies a detection stage of a detection and segmentation algorithm to the image. A processor computes a set of features from a detection score map output by the detection stage of the detection and segmentation algorithm by analyzing the detection score map at more than one different operating points. A processor inputs the set of features into a classifier that predicts whether a final output of the detection and segmentation algorithm will be of an acceptable quality, wherein the acceptable quality is defined based on whether a detection precision threshold has been reached. A processor receives an output of the classifier.

DETAILED DESCRIPTION

Embodiments of the present invention recognize that automated processing of medical images has the potential to ease the detection and segmentation tasks usually performed by a radiologist. While successful deep learning-based methods might achieve good performance over a large portion of cases they are applied to, these methods do sometimes fail, especially when analyzing data that is too far away from a dataset distribution the model was trained on. Embodiments of the present invention further recognize that when detection and segmentation algorithms fail to produce acceptable results, this may hurt the confidence of an end user in the tool utilizing detection and segmentation algorithms. Thus, embodiments of the present invention recognize the need to keep the end user's confidence in tools utilizing these algorithms high by preventing poor quality outputs from being shown to the end user.

Embodiments of the present invention provide a system and method for automatically detecting whether an output of a detection and segmentation algorithm is of an acceptable quality, in which an acceptable quality is defined in terms of a detection precision. A detection and segmentation algorithm involves two stages: a detection stage and a segmentation stage. The output from the detection stage (i.e., a detection score map) is known as the intermediate (or internal) output that is used in the segmentation stage to compute a final output (i.e., set of segmented objects). Embodiments of the present invention provide a system and method for using the intermediate output of the algorithm to determine or predict whether the final output of the algorithm will produce acceptable results that should be shown to an end user. Embodiments of the present invention process the intermediate output to compute a set of features analyzed at multiple different operating points. Based on this analysis, embodiments of the present invention predict when an input is poorly processed or of a poor quality and prevent the final output from being shown to an end user.

Implementation of embodiments of the invention may take a variety of forms, and exemplary implementation details are discussed subsequently with reference to the Figures.

Figure 1:
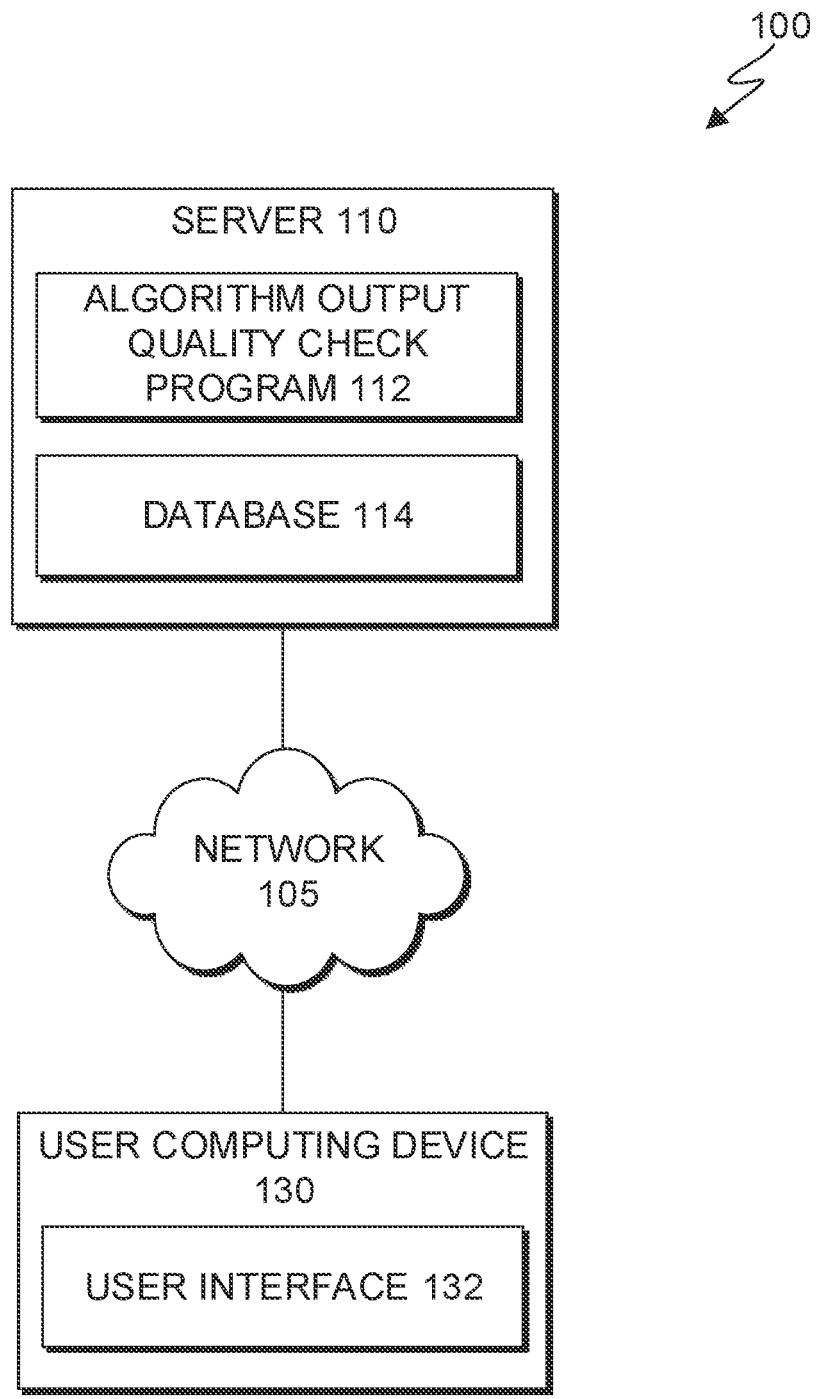
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 130, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 130, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 130 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes algorithm output quality check program 112 and database 114. Server 110 may include internal and external hardware components, as depicted and described in further detail with respect to FIG. 3.

Algorithm output quality check program 112 operates to automatically detecting whether an output of a detection and segmentation algorithm is of an acceptable quality. Algorithm output quality check program 112 works at the study level to access the quality of an algorithm's output for detection of objects in the input image, e.g., should the algorithm's prediction be accepted or rejected. In the depicted embodiment, algorithm output quality check program 112 is a standalone program. In another embodiment, algorithm output quality check program 112 may be integrated into another software product, e.g., data quality software package. In some embodiments, algorithm output quality check program 112 runs in parallel with a detection and segmentation algorithm. Algorithm output quality check program 112 is depicted and described in further detail with respect to FIG. 2.

Database 114 operates as a repository for data received, used, and/or output by algorithm output quality check program 112. Data received, used, and/or generated may include, but is not limited to, input data (e.g., image data); output of detection stage of algorithm; set of features computed; output of classifier (i.e., predictions of final output quality); and any other data received, used, and/or output by algorithm output quality check program 112. Database 114 can be implemented with any type of storage device capable of storing data and configuration files that can be accessed and utilized by server 110, such as a hard disk drive, a database server, or a flash memory. In an embodiment, database 114 is accessed by multimodal data quality program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that algorithm output quality check program 112 has access to database 114.

User computing device 130 operates as a computing device associated with a user on which the user can interact with algorithm output quality check program 112 through an application user interface. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105.

User interface 132 provides an interface between algorithm output quality check program 112 on server 110 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enables a user of user computing device 130 to input the different preset thresholds used to compute the set of features. User interface 132 also enables a user of user computing device 130 to view and/or manage output of algorithm output quality check program 112.

Figure 2:
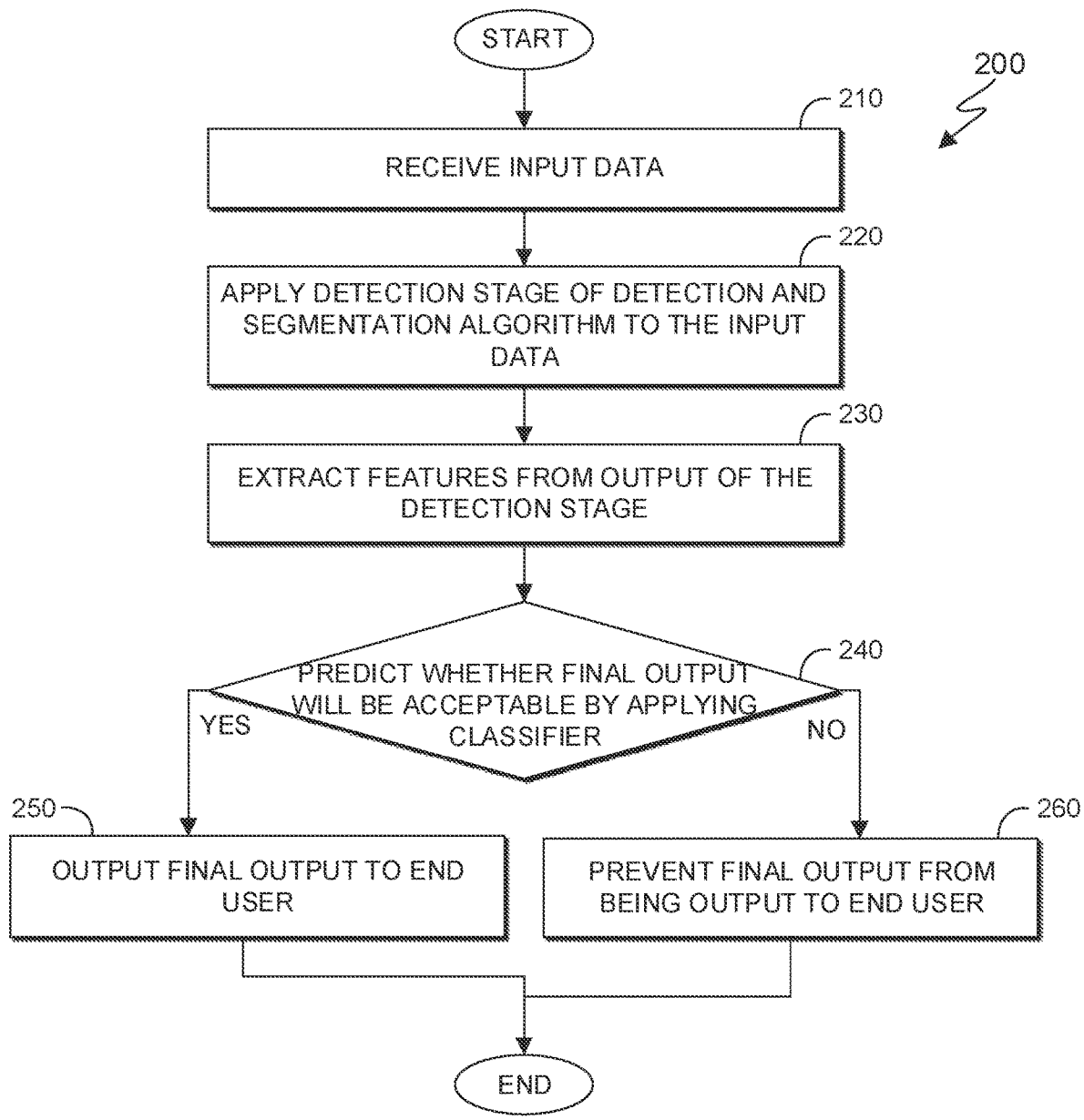
FIG. 2 is a flowchart depicting operational steps of an algorithm output quality check program, for automatically detecting whether an output of a detection and segmentation algorithm is of an acceptable quality, running on a server of the distributed data processing environment of FIG. 1 in accordance with an embodiment of the present invention.

FIG. 2 is a flowchart 200 depicting operational steps of algorithm output quality check program 112, for automatically detecting when an output of an algorithm is of poor quality, running on a server of the distributed data processing environment of FIG. 1 in accordance with an embodiment of the present invention. It should be appreciated that the process depicted in FIG. 2 illustrates one possible iteration of algorithm output quality check program 112, which may be repeated for each set of data received by the program.

In step 210, algorithm output quality check program 112 receives input data. In an embodiment, algorithm output quality check program 112 receives at least one image (e.g., image of a specific medical imaging modality) as the input data. In some embodiments, algorithm output quality check program 112 receives the at least one image from an end user that input the image through a user interface, e.g., user interface 132 of user computing device 130. In other embodiments, algorithm output quality check program 112 receives the at least one image from a database, e.g., database 114.

In step 220, algorithm output quality check program 112 applies a detection stage of a detection and segmentation algorithm to the input data. The detection and segmentation algorithm involves two stages: a detection stage and a segmentation stage. The output from the detection stage (i.e., a detection score map) is known as the intermediate (or internal) output that is used in the segmentation stage to compute a final output (i.e., set of segmented objects). In an embodiment, for a detection and segmentation algorithm ("the algorithm"), algorithm output quality check program 112 applies the first stage (i.e., detection stage) to the input data and receives an output in the form of a detection score map from the detection stage of the algorithm. An output detection score map is an image of the same size as the input image where each voxel has a value between zero (0) and one (1), related to the likelihood of that voxel being part of a lesion.

In step 230, algorithm output quality check program 112 computes a set of features from the output of the detection stage of the algorithm by analyzing the output at different operating points. In an embodiment, algorithm output quality check program 112 computes a set of features (i.e., one or more quantities) from the detection score map output by the detection stage of the algorithm by analyzing the detection score map at different operating points (i.e., different threshold values). The computed set of features is subsequently used as inputs to a classifier to determine whether the algorithm's output is of high or poor quality. Traditionally, the input data that goes into machine learning models (e.g., a classifier) are called "features" as they represent characteristics of the underlying dataset. For example, for a medical image, algorithm output quality check program 112 analyzes the number of detected lesions in a detection score map output by the detection stage of the algorithm at different threshold values.

In order to convert the output detection score map into a binary map in which each voxel has a hard value of 0 (no lesion) or 1 (lesion), algorithm output quality check program 112 needs to apply a threshold value to the detection score map to convert score values to binary values (either 0 or 1). For instance, if the threshold value is set to 0.5, then algorithm output quality check program 112 sets all voxels with a score below 0.5 to 0 and all voxels with a score equal or greater than 0.5 to 1. In an embodiment, algorithm output quality check program 112 converts the detection score map into a binary map by applying a preset threshold to each score value for each voxel to obtain a corresponding binary value for each voxel. A key advantage to the described invention is that features are computed from the detection score map at different threshold values (i.e., different operating points). The features are used as inputs for a machine learning classifier that determines whether the algorithm's output is of high quality or poor quality (see decision 240 below).

The motivation for this approach is that in studies where the detection model produces high-quality outputs, the features computed at different operating points do not change much as the detection score map is certain (voxels values are either very close to 0 or very close to 1). In studies with poor detection quality, the detection score map is uncertain and there will be voxels with values more evenly distributed between 0 and 1. As a result, the features computed at different operating points will change a lot.

Once algorithm output quality check program 112 has applied a threshold and converted the decision score map into a binary map, algorithm output quality check program 112 knows whether a voxel is a lesion (voxel value is 1) or background (voxel value is 0). However, the partition of objects/components (e.g., lesions) in the image is still unknown. Thus, algorithm output quality check program 112 continues processing by applying a connected component algorithm to group voxels that belong to the same object together, so that algorithm output quality check program 112 can separate each individual object in the image as a different instance. Once algorithm output quality check program 112 separates each individual object (e.g., lesion) in the image, algorithm output quality check program 112 can compute different characteristics or features, e.g., the number of lesions in the image, the size or volume of each lesion, etc, for the threshold applied.

As a result, after this processing is completed, the number of connected objects for each threshold value, as this processing is repeated for each threshold value applied. For example, once algorithm output quality check program 112 applies ten threshold values [0.1, 0.2, . . . 0.9, 1.0], algorithm output quality check program 112 identifies the corresponding number of connected objects for each threshold value. In an embodiment for identifying lesions from a medical image, this number can be referred to as the Lesion Trace, so for the example with ten threshold values applied, the Lesion Trace would consist of a set of 10 numbers. In this embodiment, algorithm output quality check program 112 takes the Lesion Trace (set of 10 numbers represented as a vector) and uses them as input to a Random Forest Classifier model that uses this feature (set of 10 numbers) to predict if the final output of the detection and segmentation algorithm is of an acceptable quality.

In an embodiment for detecting liver lesions using the algorithm, the feature that was most useful to predict quality of the algorithm's output was the number of detected lesions (normalized) as a function of the threshold applied (also referred to as the 'Lesion Trace'). However, other features could also be used such as the distribution of lesion size as a function of the operating point.

In decision 240, algorithm output quality check program 112 determines whether a final output will produce acceptable results by applying a classifier model. In an embodiment, algorithm output quality check program 112 uses the set of features computed as input data in a classifier model that performs a binary classification task to determine whether a final output of the algorithm will produce acceptable results (i.e., will be of good/high quality or bad/low quality), in which what is acceptable is defined in terms of a detection precision. Detection precision represents the fraction of all detected objects (e.g., lesions) in a given study that are actually true positives (i.e., they correspond to correct detections of the object in the image, e.g., real liver lesions in the image). For example, a precision of 0.5 means that half of the lesions detected by the algorithm were true positives (e.g., actual lesions) while the other half were false positives. A precision below 0.5 indicates that the algorithm output is producing more false positives than true positive detections on a given study.

In an embodiment, algorithm output quality check program 112 utilizes a trained machine learning classifier model based on the Random Forest method as known to a person of skill in the art. In an embodiment, algorithm output quality check program 112 sets a detection precision threshold that must be reached (e.g., greater than or equal to 0.5) for the classifier model to determine that the final output of the algorithm will product acceptable results. In some embodiments, algorithm output quality check program 112 trains the classifier model using the computed set of features for separate datasets of input images that were not used for training the algorithm. In some embodiments, algorithm output quality check program 112 trains the Random Forest classifier model with a dataset of features from good and bad detection quality outputs to predict whether these detection outputs were of good or bad quality according to a precision criterion threshold (e.g., 0.5).

In step 250, responsive to determining the final output will product acceptable results, algorithm output quality check program 112 outputs the final output to an end user. In an embodiment, responsive to the classifier model determining the detection precision threshold has been reached, algorithm output quality check program 112 outputs the final output of the algorithm to an end user. In an embodiment, algorithm output quality check program 112 displays the final output of the algorithm to an end user through a user interface, e.g., user interface 132.

In step 260, responsive to determining the final output will not product acceptable results, algorithm output quality check program 112 prevents the final output from being revealed (i.e., shown or displayed via a user interface) to an end user. In an embodiment, responsive to the classifier model determining the detection precision threshold has not been reached, algorithm output quality check program 112 prevents the final output of the algorithm from being shown to an end user. In an embodiment, algorithm output quality check program 112 prevents the final output of the algorithm from being displayed to an end user through a user interface, e.g., user interface 132. In some embodiments, algorithm output quality check program 112 outputs a notification to an end user that the input image could not be reliably analyzed by the algorithm.

In an example embodiment, algorithm output quality check program 112 receives a medical image from a liver exam. Algorithm output quality check program 112 applies a neural network-based detection stage of a detection algorithm to the image. The detection algorithm outputs an image with the same dimensions and structure as the input image, in which the intensity of each pixel is replaced with a number between 0 and 1 indicating the algorithm's level of confidence that this pixel belongs to a lesion.

For each of a set of confidence thresholds between 0 and 1, algorithm output quality check program 112 converts the confidence image into a binary map whose pixels are either 0 or 1, according to whether the original confidence was below or above the threshold. Algorithm output quality check program 112 then extracts the connected components of the binary image, representing spatially contiguous sets of adjacent pixels that are most likely to each constitute a unique lesion. Algorithm output quality check program 112 records the number of these connected components for each threshold and divides by the number at a particular threshold as a means of standardization. The standardized number of connected components as a function of the confidence threshold is called the "Lesion Trace".

When the detection algorithm has performed poorly, the algorithm generates outputs with confidences distributed throughout the interval between 0 and 1, so that the Lesion Trace shows a number of connected components that varies strongly with the confidence threshold. In contrast, when the detection algorithm has performed well, the algorithm generates outputs with confidences clustered around 0 and 1 with few values in between, so that the Lesion Trace shows very little variation of the number of connected components as a function of the confidence threshold. A classifier trained on this data learns to appreciate this difference, achieving accurate classification of acceptable processing results.

Responsive to the classifier predicting the image has been processed acceptably, algorithm output quality check program 112 outputs the final output of the algorithm to an end user. Responsive to the classifier predicting the image has not been processed acceptably, algorithm output quality check program 112 outputs a notification to an end user that the image could not be reliably analyzed by the algorithm.

Figure 3:
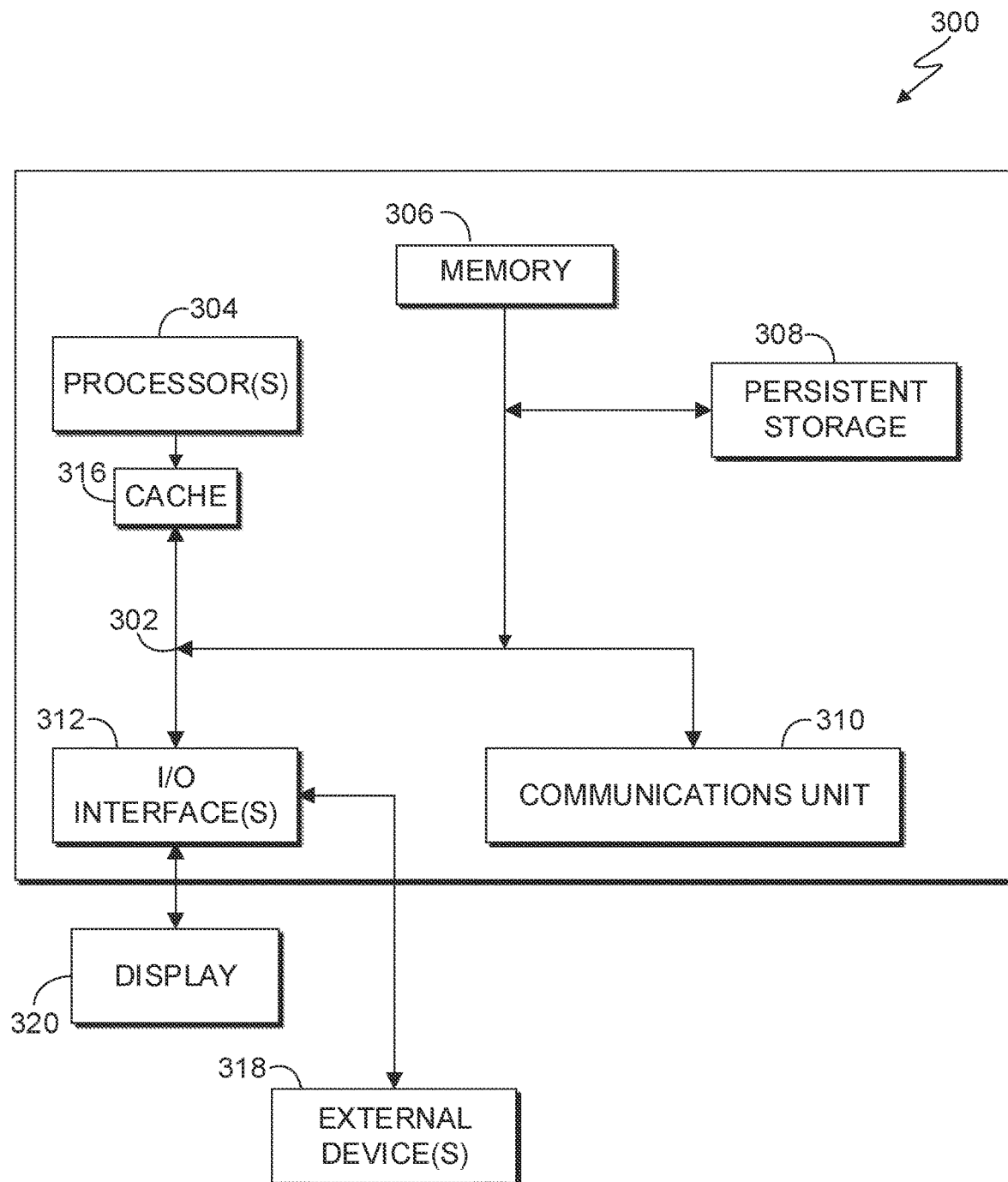
FIG. 3 depicts a block diagram of components of the server of the distributed data processing environment of FIG. 1, for running the algorithm output quality check program, in accordance with an embodiment of the present invention.

FIG. 3 depicts a block diagram of components of computing device 300, suitable for server 110 running algorithm output quality check program 112 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, an image;
applying, by the one or more processors, a detection stage of a detection and segmentation algorithm to the image;
computing, by the one or more processors, a set of features from a detection score map output by the detection stage of the detection and segmentation algorithm by analyzing the detection score map at more than one different operating points, wherein the set of features are computed from the detection score map at different threshold values;
inputting, by the one or more processors, the set of features into a classifier that predicts whether a final output of the detection and segmentation algorithm will be of an acceptable quality, wherein the acceptable quality is defined based on whether a detection precision threshold has been reached;
receiving, by the one or more processors, an output of the classifier;
outputting a secondary image with the same dimensions and structure as the image, in which the intensity of each pixel is replaced with a number between 0 and 1 indicating the algorithm's level of confidence that this pixel belongs to a lesion.

2. The computer-implemented method of claim 1, further comprising:
responsive to the detection precision threshold being reached, displaying, by the one or more processors, the final output to a user through a user interface.

3. The computer-implemented method of claim 1, further comprising:
responsive to the detection precision threshold not being reached, preventing, by the one or more processors, the final output from being displayed to a user through a user interface.

4. The computer-implemented method of claim 1, wherein computing the set of features comprises:
converting, by the one or more processors, the detection score map into a binary map by applying a preset threshold to each score value for each voxel to obtain a corresponding binary value for each voxel;
applying, by the one or more processors, a connected component algorithm to group voxels with a same binary value together;
separating, by the one or more processors, respective grouped voxels with the same binary value; and
computing, by the one or more processors, the set of features based on the respective grouped voxels.

5. The computer-implemented method of claim 4, wherein computing the set of features further comprises:
repeating, by the one or more processors, the converting, the applying, the separating, and the computing steps using a different preset threshold.

6. The computer-implemented method of claim 1, wherein the classifier is a trained machine learning classifier model based on Random Forest method.

7. The computer-implemented method of claim 3, further comprising:
sending, by the one or more processors, a notification to the user that the image could not be reliably analyzed by the detection and segmentation algorithm.

8. A computer program product comprising:
one or more computer readable storage media, comprising a non-transitory computer readable media, and program instructions collectively stored on the one or more computer readable storage media, the stored program instructions comprising:
program instructions to receive an image;
program instructions to apply a detection stage of a detection and segmentation algorithm to the image;
program instructions to compute a set of features from a detection score map output by the detection stage of the detection and segmentation algorithm by analyzing the detection score map at more than one different operating points, wherein the set of features are computed from the detection score map at different threshold values;
program instructions to input the set of features into a classifier that predicts whether a final output of the detection and segmentation algorithm will be of an acceptable quality, wherein the acceptable quality is defined based on whether a detection precision threshold has been reached;
program instructions to receive an output of the classifier; and
program instructions to output a secondary image with the same dimensions and structure as the image, in which the intensity of each pixel is replaced with a number between 0 and 1 indicating the algorithm's level of confidence that this pixel belongs to a lesion.

9. The computer program product of claim 8, further comprising:
responsive to the detection precision threshold being reached, program instructions to display the final output to a user through a user interface.

10. The computer program product of claim 8, further comprising:
responsive to the detection precision threshold not being reached, program instructions to prevent the final output from being displayed to a user through a user interface.

11. The computer program product of claim 8, wherein the program instructions to compute the set of features comprise:
program instructions to convert the detection score map into a binary map by applying a preset threshold to each score value for each voxel to obtain a corresponding binary value for each voxel;
program instructions to apply a connected component algorithm to group voxels with a same binary value together;
program instructions to separate respective grouped voxels with the same binary value; and
program instructions to compute the set of features based on the respective grouped voxels.

12. The computer program product of claim 11, wherein the program instructions to compute the set of features further comprise:
program instructions to repeat the converting, the applying, the separating, and the computing steps using a different preset threshold.

13. The computer program product of claim 8, wherein the classifier is a trained machine learning classifier model based on Random Forest method.

14. The computer program product of claim 10, further comprising:
program instructions to send a notification to the user that the image could not be reliably analyzed by the detection and segmentation algorithm.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive an image;
program instructions to apply a detection stage of a detection and segmentation algorithm to the image;
program instructions to compute a set of features from a detection score map output by the detection stage of the detection and segmentation algorithm by analyzing the detection score map at more than one different operating points, wherein the set of features are computed from the detection score map at different threshold values;
program instructions to input the set of features into a classifier that predicts whether a final output of the detection and segmentation algorithm will be of an acceptable quality, wherein the acceptable quality is defined based on whether a detection precision threshold has been reached;
program instructions to receive an output of the classifier; and
program instructions to output a secondary image with the same dimensions and structure as the image, in which the intensity of each pixel is replaced with a number between 0 and 1 indicating the algorithm's level of confidence that this pixel belongs to a lesion.

16. The computer system of claim 15, further comprising:
responsive to the detection precision threshold being reached, program instructions to display the final output to a user through a user interface.

17. The computer system of claim 15, further comprising:
responsive to the detection precision threshold not being reached, program instructions to prevent the final output from being displayed to a user through a user interface.

18. The computer system of claim 15, wherein the program instructions to compute the set of features comprise:
program instructions to convert the detection score map into a binary map by applying a preset threshold to each score value for each voxel to obtain a corresponding binary value for each voxel;
program instructions to apply a connected component algorithm to group voxels with a same binary value together;
program instructions to separate respective grouped voxels with the same binary value; and
program instructions to compute the set of features based on the respective grouped voxels.

19. The computer system of claim 18, wherein the program instructions to compute the set of features further comprise:
program instructions to repeat the converting, the applying, the separating, and the computing steps using a different preset threshold.

20. The computer system of claim 15, wherein the classifier is a trained machine learning classifier model based on Random Forest method.

* * * * *